US 11,248,590 B2

(12) United States Patent
Bak et al.

(10) Patent No.: US 11,248,590 B2
(45) Date of Patent: Feb. 15, 2022

(54) BEARING ARRANGEMENT FOR A WIND TURBINE AND WIND TURBINE

(71) Applicant: Siemens Gamesa Renewable Energy A/S, Brande (DK)

(72) Inventors: Frank Bak, Aarhus V (DK); Edom Demissie, Sheffield (GB); Niels Karl Frydendal, Herning (DK); Vujadin Petronic, Brande (DK); Morten Soerensen, Horsens (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 16/866,823

(22) Filed: May 5, 2020

(65) Prior Publication Data

US 2020/0362831 A1 Nov. 19, 2020

(30) Foreign Application Priority Data

May 16, 2019 (EP) .................................... 19174879

(51) Int. Cl.
*F03D 80/70* (2016.01)
*F03D 9/25* (2016.01)

(52) U.S. Cl.
CPC .............. *F03D 80/70* (2016.05); *F03D 9/25* (2016.05); *F05B 2240/54* (2013.01); *F05B 2260/98* (2013.01)

(58) Field of Classification Search
CPC ...... F03D 80/70; F03D 15/00; F05B 2240/54; F05B 2260/98; F05B 2260/603;

(Continued)

(56) References Cited

U.S. PATENT DOCUMENTS

| 2010/0133854 | A1 | 6/2010 | Jansen et al. |
| 2012/0328440 | A1 | 12/2012 | Vettese et al. |
| 2013/0076042 | A1* | 3/2013 | Amano ..................... F03D 9/17 290/55 |

FOREIGN PATENT DOCUMENTS

| CN | 205780749 U | 12/2016 |
| CN | 206112021 U | 4/2017 |

(Continued)

OTHER PUBLICATIONS

European Search Report and Written Opinion of the European Searching Authority dated Nov. 22, 2019 for Application No. 19174879.7.

*Primary Examiner* — Charles Reid, Jr.
(74) *Attorney, Agent, or Firm* — Schmeiser, Olsen & Watts LLP

(57) ABSTRACT

Provided is a bearing arrangement for a wind turbine including a bearing housing and a drive shaft, whereby the drive shaft is arranged within the bearing housing in an axial direction along a longitudinal axis of the bearing housing. The bearing arrangement further includes a downwind bearing and an upwind bearing, whereby the downwind bearing and the upwind bearing are arranged between the bearing housing and the drive shaft. The bearing housing includes a drain outlet arranged in a bottom part of the bearing housing, the bottom part of the bearing housing being located underneath the drive shaft in a direction of gravity, whereby at least one inner side of the bottom part of the bearing housing is arranged so as to form a funnel, whereby the drain outlet is an opening of the formed funnel.

11 Claims, 6 Drawing Sheets

Figure 1:
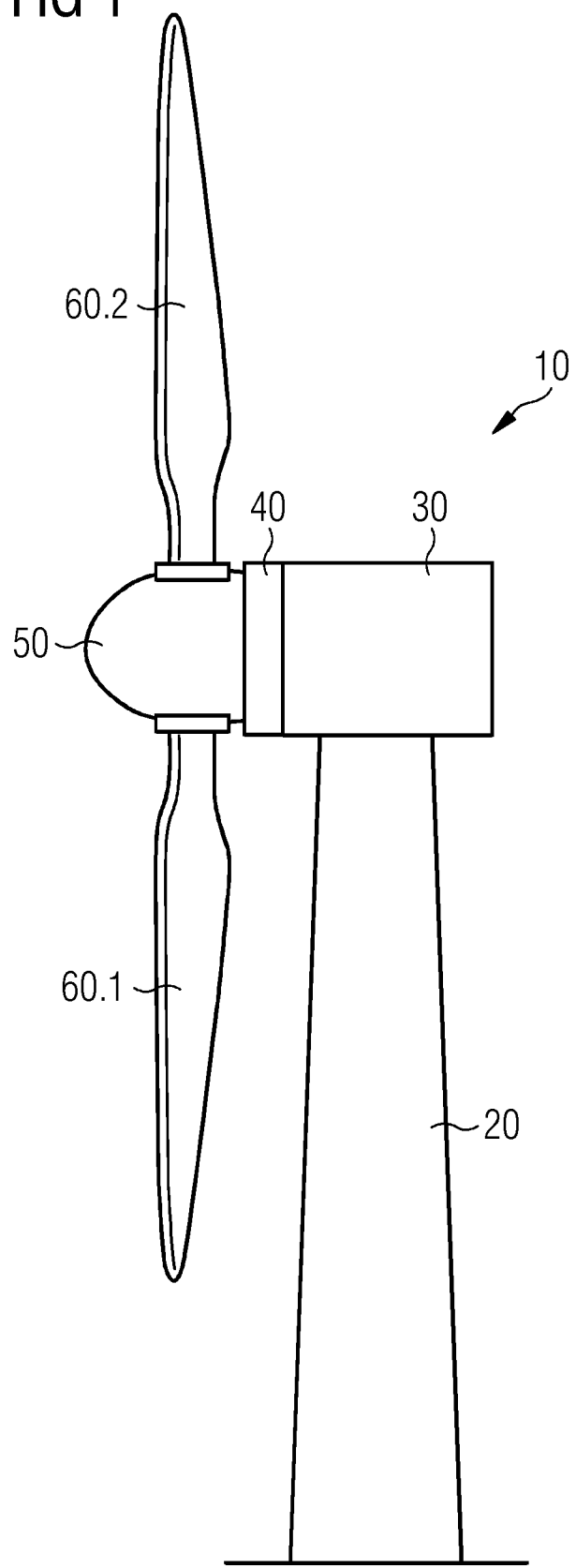

(58) Field of Classification Search
CPC .............. F05B 2240/53; F05B 2240/57; F16C 33/1025; F16C 35/02; F16C 17/26; F16C 3/02; F16C 2360/31; F16N 31/00; F16N 2210/025; Y02E 10/72
USPC ...................................................... 290/44, 55
See application file for complete search history.

(56) References Cited

FOREIGN PATENT DOCUMENTS

| | | | |
|---|---|---|---|
| CN | 108331909 | A | 7/2018 |
| EP | 3219984 | A | 9/2017 |
| EP | 3252306 | A1 | 12/2017 |
| EP | 3 276 192 | A1 | 1/2018 |
| EP | 3276192 | A1 | 1/2018 |
| EP | 3460238 | A1 | 3/2019 |
| EP | 3460268 | A1 | 3/2019 |
| EP | 3460269 | A1 | 3/2019 |
| EP | 3460270 | A1 | 3/2019 |
| EP | 3460271 | A | 3/2019 |
| EP | 3577356 | A1 | 12/2019 |
| EP | 3577361 | A1 | 12/2019 |
| WO | WO 2018024410 | A1 | 2/2018 |

\* cited by examiner

BEARING ARRANGEMENT FOR A WIND TURBINE AND WIND TURBINE

CROSS-REFERENCE TO RELATED APPLICATIONS

This application claims priority to European Application No. 19174879.7, having a filing date of May 16, 2019, the entire contents of which are hereby incorporated by reference.

FIELD OF TECHNOLOGY

The following relates to a bearing arrangement for a wind turbine, and a wind turbine including the bearing arrangement.

BACKGROUND

In general, bearing arrangements of wind turbines comprise a bearing housing and a drive shaft, whereby the drive shaft is arranged within the bearing housing in an axial direction along a longitudinal axis of the bearing housing. Bearings of the bearing arrangement are arranged about the drive shaft, so that the drive shaft can be rotated within the bearing housing by means of a rotor of the wind turbine. Such a bearing arrangement is known from EP 3 276 192 A1, for example.

The bearings of the bearing arrangement need to be constantly lubricated to function properly and without failure. In small electrical machines, lubricant leakage from bearings is small and can therefore be collected in service intervals of the small electrical machines. However, in large electrical machines, like in wind turbines, seals arranged about the drive shaft to contain the lubricant within the bearing are not as tight as in small electrical machines. As a result, the bearings of the bearing arrangement of the wind turbine leak significant amounts of lubricant. The leaked lubricant must be collected and removed during operation of the wind turbine due to its significant amount.

SUMMARY

An aspect relates to the handling of lubricant leakage in bearing arrangements, in particular to provide a bearing arrangement for a wind turbine with improved leaked lubricant handling capabilities.

Thereby, the features and details described in connection with the bearing arrangement of embodiments of the invention apply in connection with the wind turbine of embodiments of the invention, so that regarding the disclosure of the individual aspects of embodiments of the invention it is or can be referred to one another.

According to a first aspect of embodiments of the invention, a bearing arrangement for a wind turbine comprising a bearing housing and a drive shaft, whereby the drive shaft is arranged within the bearing housing in an axial direction along a longitudinal axis of the bearing housing, the bearing arrangement further comprising a downwind bearing and an upwind bearing, whereby the downwind bearing and the upwind bearing are arranged between the bearing housing and the drive shaft, whereby the bearing housing comprises a drain outlet arranged in a bottom part of the bearing housing, the bottom part of the bearing housing being located underneath the drive shaft in a direction of gravity, and that at least one inner side of the bottom part of the bearing housing is arranged so as to form a funnel, whereby the drain outlet is an opening of the formed funnel.

Due to leakage through the upwind bearing and downwind bearing, lubricant is leaking into an internal space of the bearing housing. Due to gravity, the lubricant is being collected in the bottom part of the bearing housing. The lubricant may be an oil, for example. By means of embodiments of the invention, the collection of the lubricant at the drain outlet is facilitated in a simple way without any need of external help, like pumping the lubricant out of the bearing housing. Thereby, the funnel formed by the at least one inner side of the bottom part may alternatively be referred to as, e.g., a drain pan.

The funnel may in particular be formed by multiple inner sides. For example, the funnel may be formed by two inner sides of the bottom part so as to have a V-shape. In another example, the funnel may be formed by three inner sides of the bottom part so as to have a three-sided pyramid shape. In yet another example, the funnel may be formed by four or more inner sides of the bottom part so as to have a four-sided or multiple-sided pyramid shape. In particular, the funnel may be integrally formed, more particularly monolithically designed, with the bottom part of the bearing housing. The bottom part of the bearing housing may be integrally formed, more particularly monolithically designed with the bearing housing. The funnel may thus be referred to as an internally casted funnel. Further, the bottom part of the bearing housing may be integrally formed, in particular monolithically designed, with the bearing housing.

The at least one inner side of the bottom part is a side pointing into the internal space of the bearing housing or in other words facing the drive shaft. The bottom part of the bearing housing also comprises at least one outer side directed away from the internal space of the bearing housing or in other words facing away from the drive shaft. The at least one outer side of the bottom part of the bearing housing may have a shape different from the shape of the funnel formed by the at least one inner side. Moreover, the at least one outer side may have a shape different from a funnel shape. The at least one outer side may for example be substantially flat or flat for the most part. In the sense of embodiments of the invention, flat means that a surface of the at least one outer side is perpendicular to a direction of gravity. Substantially flat means that a surface of the at least one outer side is perpendicular within a range of ±10° to a direction of gravity. Thereby, the mounting of the bearing housing by means of its bottom part in the wind turbine, for example at the nacelle, is facilitated and the manufacturing is simplified.

The drain outlet is an opening in the bottom part of the bearing housing. The drain outlet in particular extends from the at least one inner side to the at least one outer side. The drain outlet may have a circular shape, for example. The drain outlet may in particular be arranged at a lowest point of the bearing housing or the bottom part of the bearing housing. The lowest point is measured in the direction of gravity. The lubricant can thereby easily flow to and through the drain outlet in order to leave the bearing housing.

The downwind bearing is in particular arranged about a downwind portion of the drive shaft. The upwind bearing is in particular arranged about an upwind portion of the drive shaft. The downwind bearing may alternatively be referred to as a back-end bearing arranged about a back-end portion of the drive shaft. The upwind bearing may alternatively be referred to as a front-end bearing arranged about a front-end portion of the drive shaft. In a wind turbine, the front-end portion of the drive shaft is located closer to the rotor than its back-end portion.

The downwind bearing and/or the upwind bearing may be radial fluid bearings. Lubricant such as oil may be provided as fluid in the radial fluid bearings. The downwind bearing and/or the upwind bearing may comprise multiple radial bearing pads arranged about the drive shaft. The multiple radial bearing pads may be arranged in series and/or in a circular arrangement about the drive shaft. The radial fluid bearing may comprise multiple radial bearing bodies, multiple radial tiltable support structures secured to the multiple radial bearing bodies, whereby each one of a multiple of radial bearing pads is attached to one of the multiple radial tiltable support structures. The multiple radial tiltable support structures are tiltable relative with respect to the drive shaft. The multiple radial tiltable support structures may comprise or be ball heads and the multiple radial bearing bodies may comprise or be ball sockets for the ball heads. The multiple radial bearing bodies may be arranged on a cylindrical seat, which may be formed by the bearing housing.

Further, an axial bearing may be arranged at the downwind and/or the upwind portion of the drive shaft. The axial bearing may comprise an axial collar and multiple axial bearing pads attached to an axial bearing stop. The axial bearing pads may be attached to the axial bearing stop by means of axial bearing bodies. The axial bearing bodies may comprise axial tiltable support structures. The axial tiltable support structures are tiltable relative with respect to the axial collar. The axial tiltable support structures may in particular comprise or be a ball head. The ball heads may be arranged in ball sockets of the axial bearing bodies.

Preferably, at least one of the at least one inner side of the bottom part is provided with at least one slope, wherein the slope is arranged at an angle α to a line perpendicular to the direction of gravity. The angle α may be in the range of 0.1° to 10°, preferably in the range of 0.1° to 5° and moreover preferably in the range of 0.2° to 3°, for example. A slope may be alternatively referred to as an incline. In a case where the bottom part comprises multiple inner sides forming the funnel, the angles α of the inner sides may be the same, substantially the same, which includes a deviation of ±10%, or different from one another. In a case where the at least one inner side comprises only one slope, the inner side is a plane side. However, the at least one inner side may also be a curved side, for example. In case of a curved side, the inner side may comprise multiple slopes, which may be different from one another not only with respect to a direction of the slopes but also with respect to the angle α of the slopes.

Moreover preferably, at least one slope of the at least one slope extends from the drain outlet in an axial direction along the longitudinal axis to the upwind bearing and/or at least one slope of the at least one slope extends from the drain outlet in an axial direction along the longitudinal axis to the downwind bearing. At least two slopes extending in opposing axial directions along the longitudinal axis may be of one inner side, for example, which means that the inner side is a curved side. Thereby, the collection of lubricant at the drain outlet may be facilitated from each, the downwind bearing and the upwind bearing, separately or together.

Further it is preferred that at least one slope of the at least one slope extends from the drain outlet in a direction transverse, in particular perpendicular, to an axial direction along the longitudinal axis. Thereby, the collection of lubricant at the drain outlet is further facilitated in a side direction corresponding to the transverse and in particular perpendicular direction.

For instance, the funnel may have a concave shape or a substantially concave shape. A concave shape may be formed by one inner side formed as a curved side. A substantially concave shape may be formed by multiple inner sides, which may in particular be curved sides or plane sides. In the sense of embodiments of the invention, it should thereby be understood that a substantially concave shape is not a perfect concave shape but approximates a concave shape. The concave or substantially concave shape of the funnel allows for a design of the funnel in the bearing housing that is easy to manufacture and having no or little obstacles for the flow of lubricant to the drain outlet.

It is preferred that the drain outlet is located closer to a center of the bottom part of the bearing housing in an axial direction along the longitudinal axis than to the downwind bearing and the upwind bearing and/or that the drain outlet is located closer to the center of the bottom part of the bearing housing in a direction perpendicular to an axial direction along the longitudinal axis than to ends of the bottom part of the bearing housing located opposite to each other in the perpendicular direction. Due to the centrally located drain outlet, the overall size of the funnel of the bottom part of the bearing housing can be kept small. Thereby, when, for example, machining the funnel into the bottom part of the bearing housing or casting the funnel with the bottom part of the bearing housing, a large wall thickness of the bottom part of the bearing housing at the location of the funnel can be provided despite provision of the funnel therein. This allows for a stable design of the bearing housing with no additional effort.

Preferably, a collecting sump is arranged underneath the drain outlet. In the collecting sump, the lubricant may be collected. Thereby, no costly parts such as a lubrication tank for collecting the lubricant and a lubrication tank pump for pumping the lubricant to the lubrication tank are necessary. The collecting sump in particular has at least one drain opening. The lubricant collected in the collecting sump can leave the collecting sump by means of the drain opening.

Further preferably, the collecting sump is a separate part attached to the bottom part of the bearing housing. In particular, the collecting sump may be directly attached to the bottom part of the bearing housing. The collecting sump may be conveniently attached to the bottom part of the bearing housing by means of bolts, for example. Providing the collecting sump as a separate part enables simple manufacture of collecting sumps with complex geometries. Moreover, collecting sumps may be easily serviced or changed. A change may be necessary when, for example, the upwind bearing and/or the downwind bearing leaks more oil than expected or due to leakage becoming larger over the course of the operation of the wind turbine, so that a larger collecting sump becomes necessary. Alternatively, the collecting sump may be integrally formed, in particular monolithically designed, with the bottom part of the bearing housing.

Moreover preferably, the collecting sump has a longitudinal extension in an axial direction along the longitudinal axis of the bearing housing. In particular, the longitudinal extension of the collecting sump may be at least two, three or four times the length of a largest extension of the bearing housing perpendicular to the axial direction of the bearing housing. Thereby, the assembly space underneath the bearing housing is effectively used.

It is further preferred that a further collecting sump is arranged underneath the collecting sump. The further collecting sump may be attached, in particular directly attached, to the bottom part of the bearing housing or the collecting sump by means of bolts, for example. The further collecting sump may comprise a drain opening. The further collecting sump together with the collecting sump provides a type of double sealed sump chamber. Therein, when the collecting sump leaks, for example through its attachment means to the bottom part of the bearing housing, the further collecting sump provides a further seal to collect the lubricant. Thereby, the likelihood of leakage of the lubricant out of the bearing arrangement is further reduced.

Moreover, it is preferred that a lubricant pump is fluidically connected to the drain outlet and to an inlet of the downwind bearing and/or an inlet of the upwind bearing. Thereby, lubricant can be led back to the downwind bearing and/or to the upwind bearing. In particular, the lubricant pump may be fluidically connected to the collecting sump or the further collecting sump. Thereby, it is possible to recirculate the lubricant to the upwind bearing and/or the downwind bearing. A computing unit may be connected to the lubricant pump for recirculating the lubricant leaked into the internal space of the bearing housing. The computing unit may further be connected to at least one lubricant level sensor in the collecting sump or further collecting sump and/or in the downwind bearing and/or in the upwind bearing.

Furthermore, it is preferred that a passive filter is arranged after the drain outlet for filtering the drained lubricant. The drained lubricant is the lubricant that leaked into the bearing housing and passed the drain outlet. By means of the passive filter it is ensured that the lubricant, which may be collected in the collecting sump and may be further used, such as by means of recirculation to the upwind bearing and/or downwind bearing, is not contaminated with foreign particles. These foreign particles may otherwise damage the downwind bearing and the upwind bearing. Further it is preferred that the passive filter is arranged before the lubricant pump. Thereby, it is prevented that foreign particles damage the lubricant pump.

The upwind bearing and/or the downwind bearing may comprise a lubricant flooded chamber, in which the multiple radial bearing pads are arranged about the drive shaft, whereby the lubricant flooded chamber is sealed against the drive shaft, an internal space of the bearing housing and an outside of the bearing housing. The lubricant flooded chamber may comprise an inlet for refilling the lubricant flooded chamber with lubricant. The inlet of the lubricant flooded chamber may be fluidically connected via a lubricant pump to the bearing housing, in particular the drain outlet and more particularly the collecting sump. The upwind bearing and/or the downwind bearing comprising the lubricant flooded chamber may comprise an inner sealing for sealing the lubricant flooded chamber against the internal space of the bearing housing, whereby the inner sealing comprises multiple inner sealing plates. The multiple inner sealing plates may have a particular shape and may be arranged so as to form a circular shaped inner sealing. At least one of the inner sealing plates may comprise at least one overflow opening from the lubricant flooded chamber to the internal space of the bearing housing. The upwind bearing and/or the downwind bearing comprising the lubricant flooded chamber may comprise an outer sealing for sealing the lubricant flooded chamber against the outside of the bearing housing, whereby the inner sealing comprises an outer seal plate. The outer sealing may comprise at least one outer lip seal for sealing the outer sealing against the drive shaft. A dust sealing may be attached to the outer sealing for preventing the entering of dust into the lubricant flooded chamber through the outer lip seal, whereby the dust sealing comprises a dust seal plate and a dust lip seal. The lubricant flooded chamber may comprise a lubricant level sensor.

According to a second aspect of embodiments of the invention, a wind turbine comprising a bearing arrangement according to embodiments of the invention, whereby the wind turbine further comprises a rotor connected to drive the drive shaft and a generator connected to be driven by the drive shaft.

The generator may be a direct drive generator or a geared generator having a gearbox, for example. The rotor is also commonly referred to as a hub of the wind turbine. Two, three or more wind turbine blades may be attached to the rotor or hub. The wind turbine may further comprise a nacelle, which may be supported on a supporting tower of the wind turbine. The nacelle may comprise the bearing arrangement. The bearing arrangement, in particular the bearing housing, and the generator may be attached to the nacelle and/or the tower.

BRIEF DESCRIPTION

Figure 2:
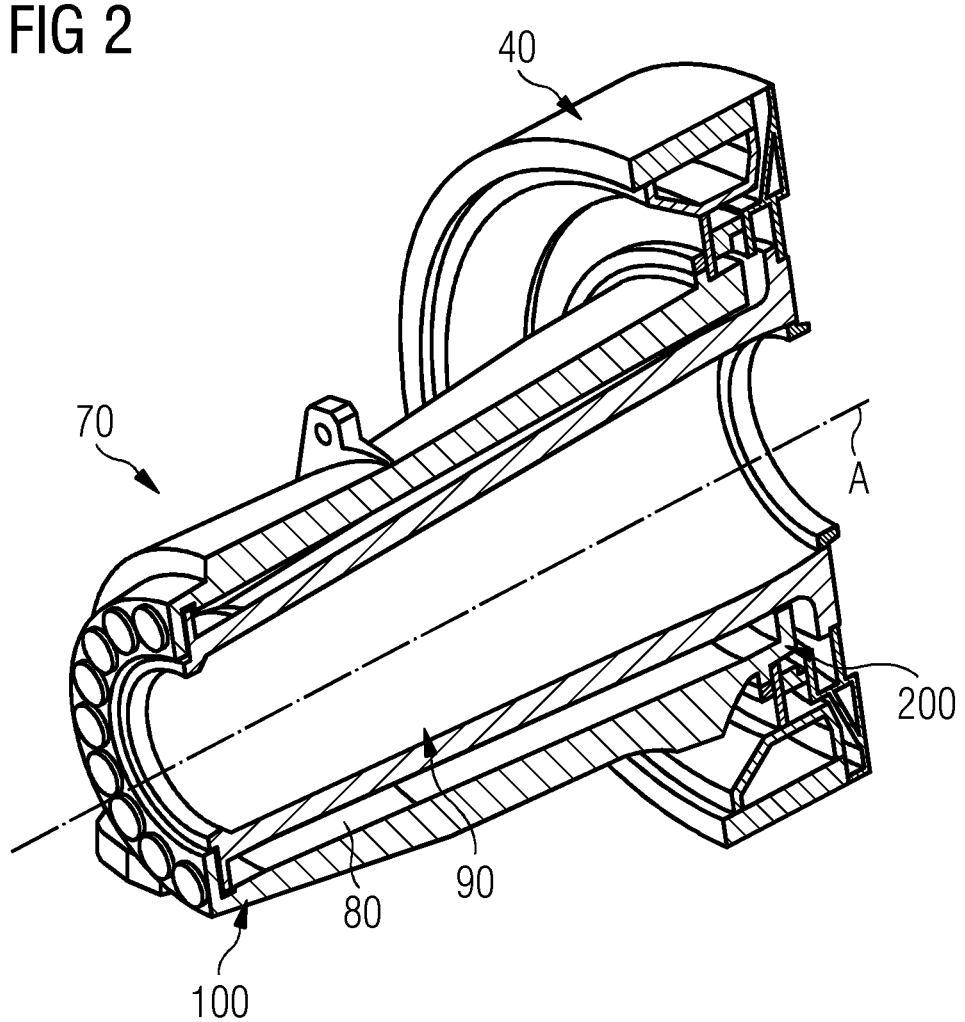
Figure 3:
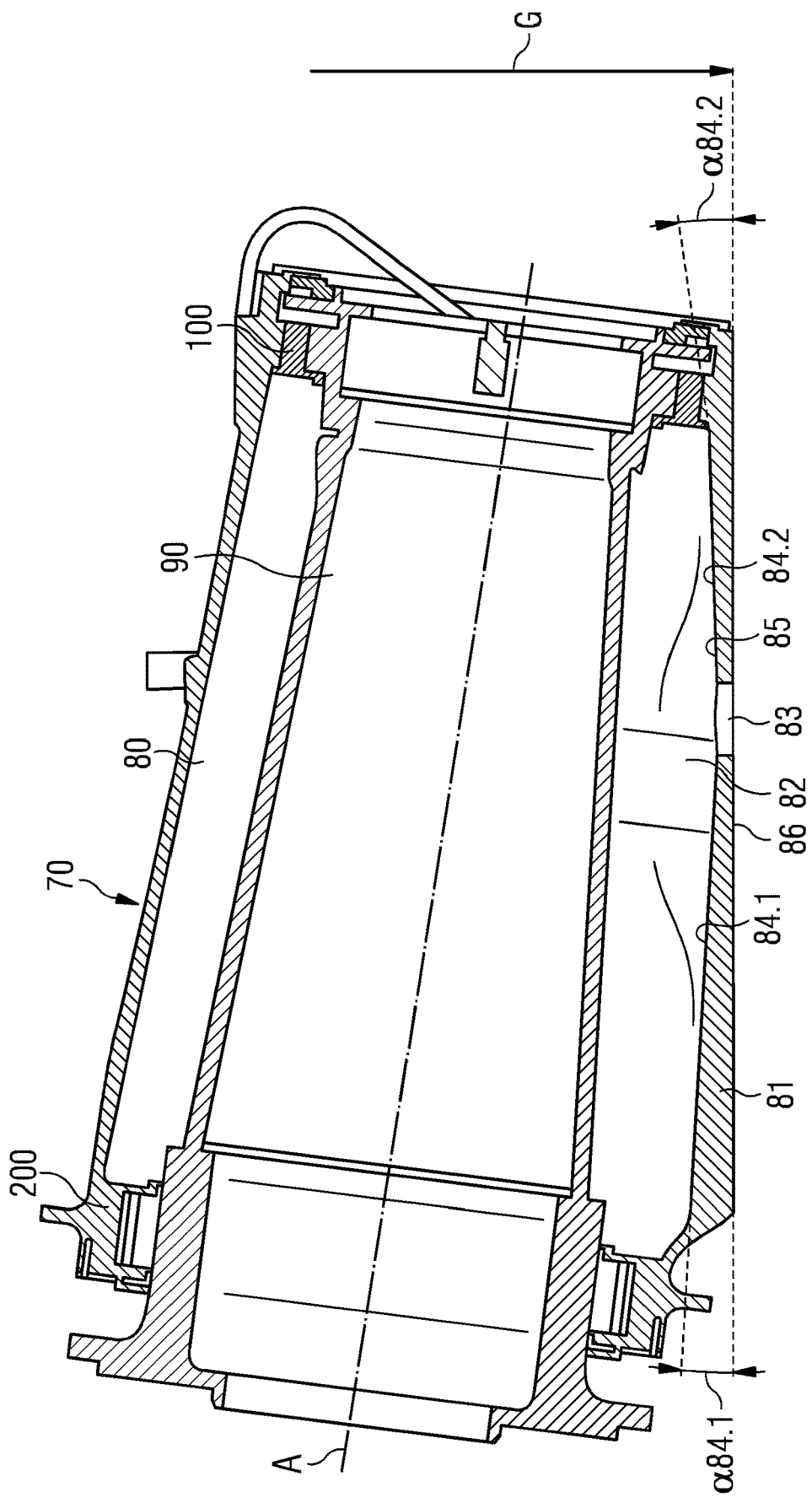
Figure 4:
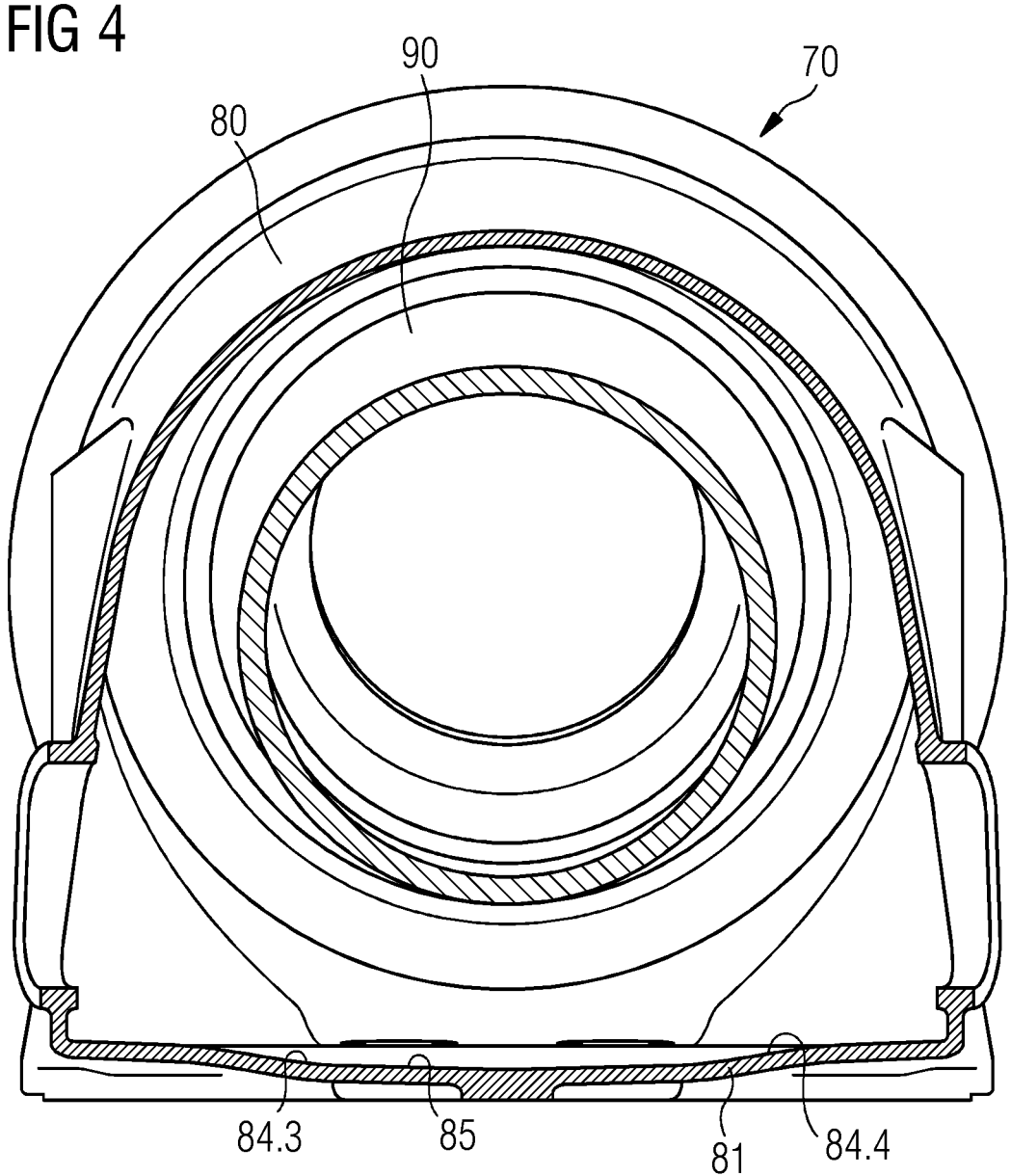
Figure 5:
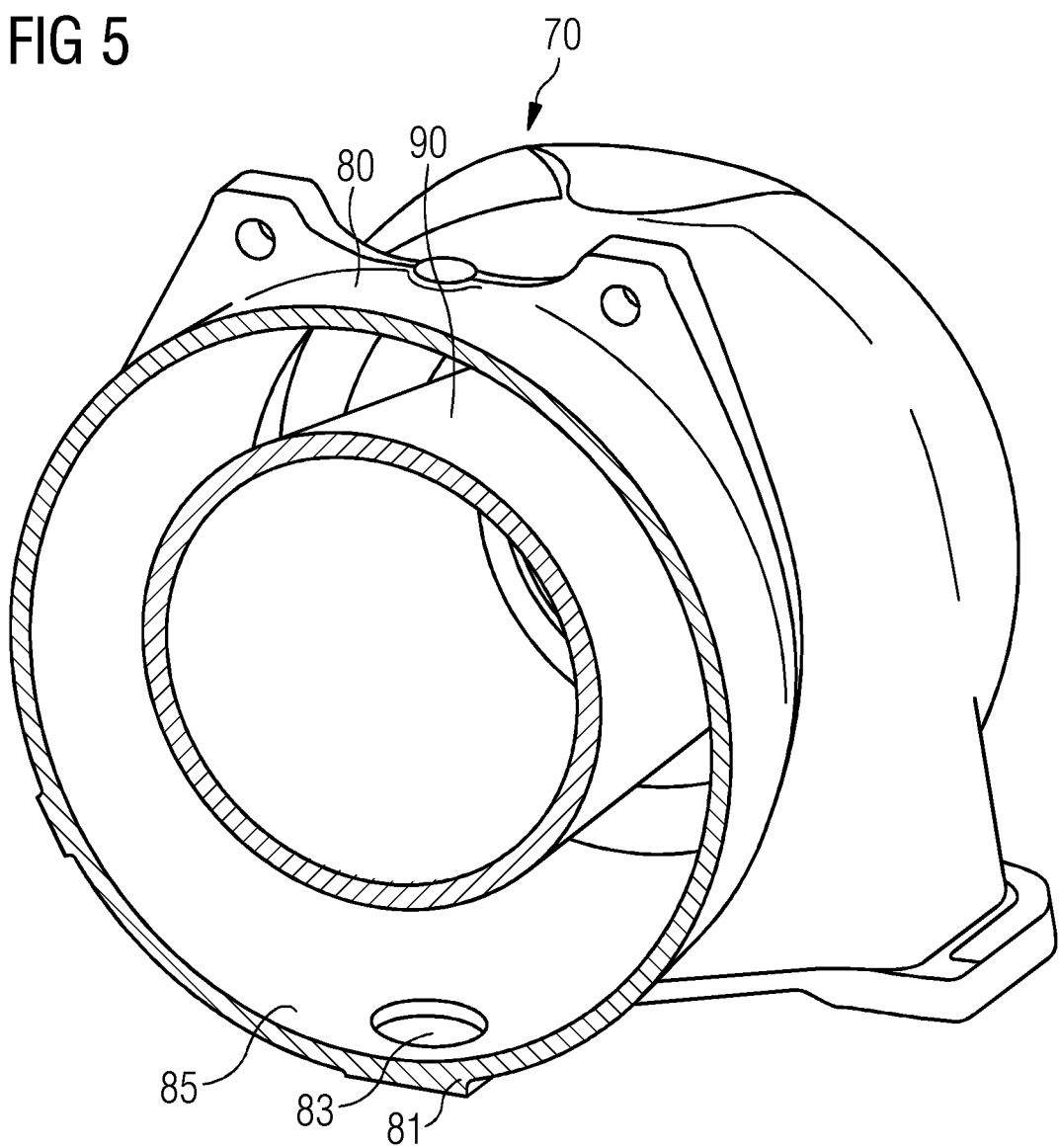
Figure 6:
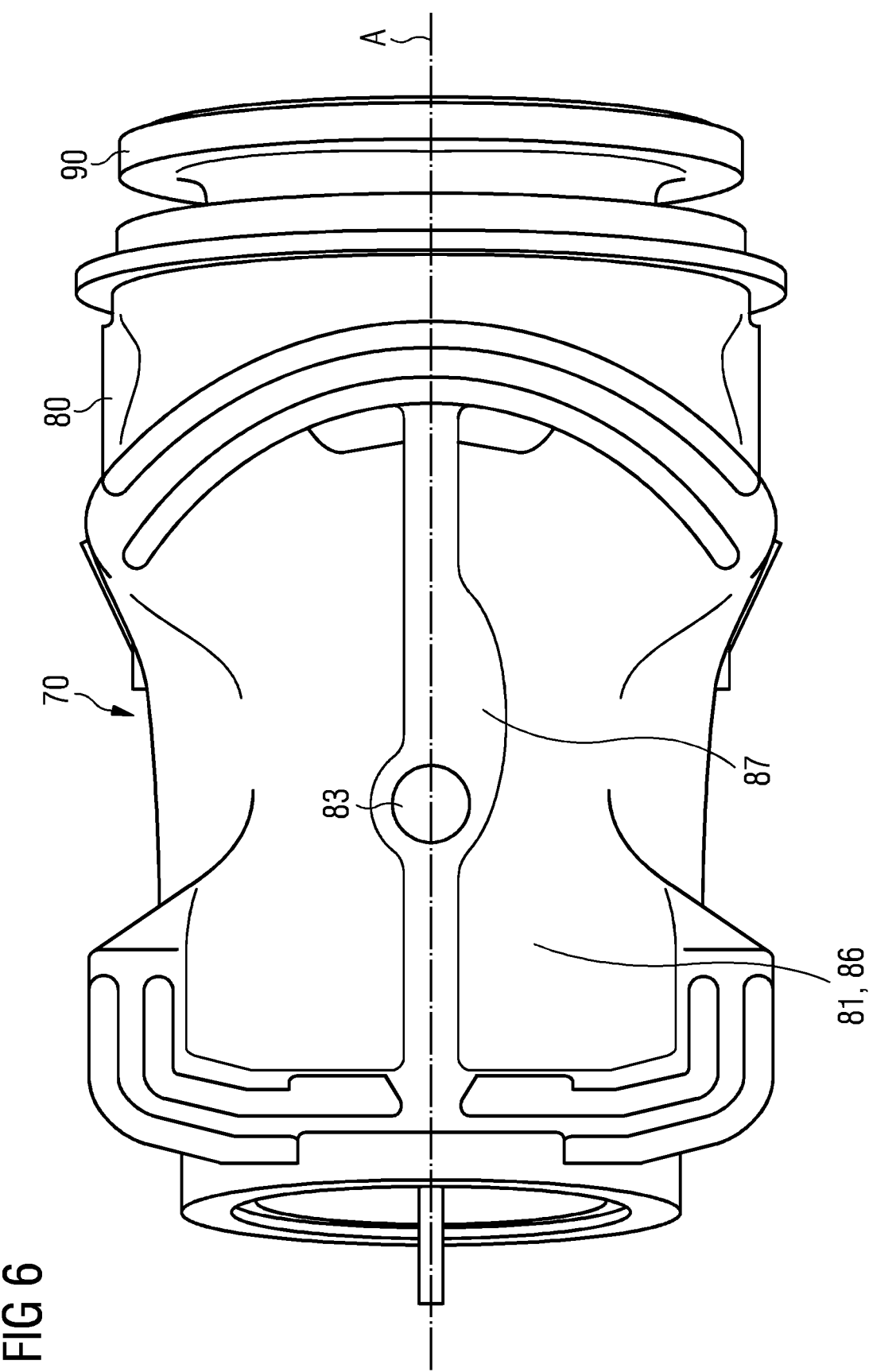

Some of the embodiments will be described in detail, with references to the following Figures, wherein like designations denote like members, wherein:

FIG. 1 a side view on a wind turbine;

FIG. 2 a side perspective view on a sectional cut along the longitudinal axis of a bearing arrangement of the wind turbine of FIG. 1;

FIG. 3 a side view on the sectional cut along the bearing arrangement of FIG. 2;

FIG. 4 a front perspective view on a sectional cut transverse to the longitudinal axis of the bearing arrangement of FIG. 2;

FIG. 5 a side perspective view on a sectional cut transverse to the longitudinal axis of the bearing arrangement of FIG. 2; and FIG. 6 a bottom view on the bearing arrangement of FIG. 2.

DETAILED DESCRIPTION

FIG. 1 shows a side view on a wind turbine 10. The wind turbine 10 comprises a supporting tower 20 and a nacelle 30, whereby the nacelle 30 is attached to the supporting tower 20. The nacelle 30 comprises a bearing arrangement 70, which is not shown in FIG. 1 but can be seen in FIG. 2. The wind turbine 10 further comprises a generator 40 attached to a rotor 50 of the wind turbine 10. Two wind turbine blades 60.1, 60.2 are attached to the rotor 50.

FIG. 2 shows a side perspective view on a sectional cut along the longitudinal axis A of the bearing arrangement 70 of the wind turbine 10 of FIG. 1. The bearing arrangement 70 comprises a bearing housing 80 and a drive shaft 90, whereby the drive shaft 90 is arranged within the bearing housing 80 in an axial direction along the longitudinal axis A of the bearing housing 80 as indicated in FIG. 2. An axial direction of the bearing housing 80 corresponds to an axial direction of the drive shaft 90. The bearing arrangement 70 further comprises a downwind bearing 100 and an upwind bearing 200, whereby the downwind bearing 100 and the upwind bearing 200 are arranged between the bearing housing 80 and the drive shaft 90. In particular, the downwind bearing 100 is arranged about a downwind portion of the drive shaft 90 and the upwind bearing 200 is arranged about an upwind portion of the drive shaft 90. The downwind bearing 100 and the upwind bearing 200 are radial fluid bearings. The drive shaft 90 is operatively connected to the generator 40. The generator 40 is shown as a direct drive generator. However, it is also possible to provide the generator 40 as a geared generator, for example.

FIG. 3 shows a side view on the sectional cut along the bearing arrangement 70 of FIG. 2. The bearing housing 80 comprises a drain outlet 83 arranged in a bottom part 81 of the bearing housing 80. The drain outlet 83 is located closer to a center of the bottom part 81 of the bearing housing 80 in an axial direction along the longitudinal axis A than to the downwind bearing 100 and to the upwind bearing 200. The bottom part 81 of the bearing housing 80 is located underneath the drive shaft 90 in a direction of gravity G. An internal space 82 of the bearing housing 80 is formed between the bearing housing 80 and the drive shaft 90. Lubricant may leak from the downwind bearing 100 and the upwind bearing 200 into the internal space 82 and thereby be collected in the bottom part 81.

Two inner sides 84.1, 84.2 of the bottom part 81 of the bearing housing 80 are facing the drive shaft 90. The inner side 84.1 is provided with a slope extending from the drain outlet 83 in an axial direction along the longitudinal axis A to the upwind bearing 200. The slope of the inner side 84.1 is arranged at an angle $\alpha_{84.1}$ to a line perpendicular to the direction of gravity G. The inner side 84.2 is provided with a slope extending from the drain outlet 83 in an axial direction along the longitudinal axis A to the downwind bearing 100. The slope of the inner side 84.2 is arranged at an angle $\alpha_{84.2}$ to the line perpendicular to the direction of gravity G. Thereby, the two inner sides 84.1, 84.2 of the bottom part 81 of the bearing housing 80 form a funnel 85. Lubricant leaked from the downwind bearing 100 and the upwind bearing 200 may flow along the funnel 85 to the drain outlet 83 without any distractions and external help.

The bottom part 81 of the bearing housing 80 also comprises an outer side 86 directed away from the internal space 82 of the bearing housing 80 or in other words facing away from the drive shaft 90. The outer side 86 is located on the opposite side of the inner sides 84.1, 84.2. The outer side 86 is flat in that it is arranged perpendicular to the direction of gravity G.

FIG. 4 shows a front perspective view on a sectional cut transverse to the longitudinal axis A of the bearing arrangement 70 of FIG. 2. The sectional cut is set before the drain outlet 83, so that the drain outlet 83 is not visible in FIG. 4. The funnel 85 is shown with two further inner sides 84.3, 84.3 having slopes extending from a center of the bottom part 81 in side directions perpendicular to an axial direction along the longitudinal axis A of the bearing housing 80.

FIG. 5 shows a side perspective view on a sectional cut transverse to the longitudinal axis A of the bearing arrangement 70 of FIG. 2. Here, it becomes clear that the previously with respect to side and front perspective views described inner sides 84.1, 84.2, 84.3, 84.4 form a substantially concave shape of the funnel 85 around the drain outlet 83.

FIG. 6 shows a bottom view on the bearing arrangement 70 of FIG. 2. A collecting sump 87 having a longitudinal extension in an axial direction along the longitudinal axis A of the bearing housing 80 is attached to the bottom part 81, in particular the outer side 86, by means of bolts. The collecting sump 87 comprises a drain opening corresponding in location and size to the drain outlet 83 for fluidically connecting the opening of the collecting sump 87 to a lubricant pump (not shown) and recirculating lubricant collected in the collecting sump 87 to inlets (not shown) of the downwind bearing 100 and/or the upwind bearing 200.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bearing arrangement for a wind turbine comprising:
   a bearing housing;
   a drive shaft arranged within the bearing housing in an axial direction along a longitudinal axis of the bearing housing;
   a downwind bearing;
   an upwind bearing, wherein the downwind bearing and the upwind bearing are arranged between the bearing housing and the drive shaft; and
   a drain outlet arranged in a bottom part of the bearing housing, the bottom part of the bearing housing being located underneath the drive shaft in a direction of gravity, and that at least one inner side of the bottom part of the bearing housing is arranged so as to form a funnel, wherein the drain outlet is an opening of the funnel, wherein the funnel including a first slope between the downwind bearing and the drain outlet, the first slope arranged at a first angle to a perpendicular direction of gravity when the bearing arrangement is installed in the wind turbine, wherein the funnel includes a second slope between the upwind bearing and the drain outlet, the second slope arranged at a second angle to the perpendicular direction of gravity, wherein the first and second slopes form the funnel, and wherein the longitudinal axis is not perpendicular to the direction of gravity.

2. The bearing arrangement according to claim 1, wherein at least one of the at least one inner side of the bottom part is provided with at least one slope, wherein the at least one slope is arranged at an angle to a line perpendicular to the direction of gravity.

3. The bearing arrangement according to claim 2, wherein at least one slope of the at least one slope extends from the drain outlet in an axial direction along the longitudinal axis of the bearing housing to the downwind bearing and/or at least one slope of the at least one slope extends from the drain outlet in an axial direction along the longitudinal axis of the bearing housing to the upwind bearing.

4. The bearing arrangement according to claim 2, wherein at least one slope of the at least one slope extends from the drain outlet in a direction transverse to an axial direction along the longitudinal axis.

5. The bearing arrangement according to claim 1, wherein the funnel has a concave shape or a substantially concave shape.

6. The bearing arrangement according to claim 1, wherein the drain outlet is located closer to a center of the bottom part of the bearing housing in an axial direction along the longitudinal axis of the bearing housing than to the downwind bearing and the upwind bearing and/or the drain outlet is located closer to the center of the bottom part of the bearing housing in a direction perpendicular to an axial direction along the longitudinal axis of the bearing housing than to ends of the bottom part of the bearing housing located opposite to each other in the perpendicular direction.

7. The bearing arrangement according to claim 1, wherein the collecting sump is a separate part attached to the bottom part of the bearing housing.

8. The bearing arrangement according to claim 1, wherein the collecting sump includes a drain opening corresponding in size and location to the drain outlet of the bearing housing.

9. A wind turbine comprising the bearing arrangement according to claim 1, the wind turbine further comprising a rotor operatively connected to drive the drive shaft and a generator operatively connected to be driven by the drive shaft.

10. The bearing arrangement according to claim 1, further comprising a collecting sump is arranged underneath the drain outlet, wherein the collecting sump has an elongated shape that extends in an axial direction along the longitudinal axis of the bearing housing.

11. The bearing arrangement according to claim 1, wherein the downwind bearing is located lower than the upwind bearing relative to the direction of gravity.

* * * * *